United States Patent
Baumgartner et al.

(10) Patent No.: US 6,741,898 B2
(45) Date of Patent: May 25, 2004

(54) METHOD OF USING NEUTRAL EVENT FILE FOR MANUFACTURING LINE ANALYSIS

(75) Inventors: Alan Newton Baumgartner, Livonia, MI (US); Joseph George Walacavage, Ypsilanti, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/681,780

(22) Filed: Jun. 4, 2001

(65) Prior Publication Data

US 2002/0040257 A1 Apr. 4, 2002

Related U.S. Application Data

(60) Provisional application No. 60/236,965, filed on Sep. 29, 2000.

(51) Int. Cl.$^7$ .............................................. G06F 19/00
(52) U.S. Cl. ............................. 700/96; 700/97; 700/99; 700/105
(58) Field of Search ................................ 700/96, 97, 99

(56) References Cited

U.S. PATENT DOCUMENTS

| | | | |
|---|---|---|---|
| 4,931,951 A | 6/1990 | Murai et al. | |
| 5,050,088 A * | 9/1991 | Buckler et al. | 700/96 |
| 5,963,447 A | 10/1999 | Kohn et al. | |
| 6,167,406 A | 12/2000 | Hoskins et al. | |
| 6,185,469 B1 * | 2/2001 | Lewis et al. | 700/99 |
| 6,223,134 B1 | 4/2001 | Rust et al. | |
| 6,263,487 B1 | 7/2001 | Stripf et al. | |
| 6,292,707 B1 * | 9/2001 | Hair et al. | 700/97 |

FOREIGN PATENT DOCUMENTS

EP          508308          4/1992

* cited by examiner

Primary Examiner—Leo Picard
Assistant Examiner—Carlos R. Ortiz
(74) Attorney, Agent, or Firm—David B. Kelley

(57) ABSTRACT

A method is provided of using a neutral event file for manufacturing line analysis. The method includes the steps of constructing a neutral event file and executing a manufacturing line analysis model using the neutral event file. The method also includes the steps of determining whether a good manufacturing line exists based on the manufacturing line analysis model and using the manufacturing line analysis model to build the manufacturing line if a good manufacturing line exists.

20 Claims, 1 Drawing Sheet

METHOD OF USING NEUTRAL EVENT FILE FOR MANUFACTURING LINE ANALYSIS

CROSS REFERENCE TO RELATED APPLICATIONS

The present application claims the priority date of co-pending U.S. Provisional Patent Application Serial No. 60/236,965, filed Sep. 29, 2000.

BACKGROUND OF INVENTION

1. Field of the Invention

The present invention relates generally to methods and, more specifically, to a method of using a neutral event file for manufacturing line analysis for manufacturing a motor vehicle.

2. Description of the Related Art

It is known that a manufacturing line is typically made of three to twenty linked workcells. Each workcell consists of a tool such as a fixture to position a product, for example sheet metal, and associated automation, for example robots, that process the product, for example by welding. The workcell typically consists of a fixture/tool surrounded by three or four robots. The product is then transferred to the next workcell in the manufacturing line for further processing, until it exits the manufacturing line.

It is also known that the workcells for a manufacturing line can be modeled before the manufacturing line is implemented. The modeling techniques, such as Robcad from Tecnomatix and Igrip from Deneb, for the manufacturing process are limited in scope to a workcell level, due to how these type of technologies represent and manipulate three dimensional data and tool motions. This scope limitation is due to the manner in which tooling geometry is defined and the manner in which tool motions are described and displayed to a user. The geometry representation is typically defined using Non-Uniform Rational BSpline (NURB) type equations, which are very exact and precise, but require intensive microprocessor calculations. The tooling and robotic motions are also microprocessor intensive in that the articulations and movements are described through the use of complex kinematic equations and solvers. Presently, there is no mechanism to verify that the planned interactions between linked workcells is indeed feasible until the manufacturing line is actually fabricated and assembled on a floor of a manufacturing plant.

Therefore, it is desirable to represent tooling space, tooling motions, and product information and transfer to enable integration and coordination into a manufacturing line for analysis prior to tool fabrication, assembly, and tryout. It is also desirable to provide a neutral event file which is not specific to any manufacturing tooling design or process planning system that contains a description of interlocked events which define the required dependencies, actions, and signals that are associated with sequencing and cycling manufacturing tooling devices. It is further desirable to provide a method that uses a neutral event file to enable collecting, locating, and event integration of independently defined tooling and workcell modeling for manufacturing line analysis. Therefore, there is a need in the art to provide a method of using a neutral event file for manufacturing line analysis for manufacturing a motor vehicle.

SUMMARY OF INVENTION

Accordingly, the present invention is a method of using a neutral event file for manufacturing line analysis. The method includes the steps of constructing a neutral event file and executing a manufacturing line analysis model using the neutral event file. The method also includes the steps of determining whether a good manufacturing line exists based on the manufacturing line analysis model and using the manufacturing line analysis model to build the manufacturing line if a good manufacturing line exists.

One advantage of the present invention is that a method of using a neutral event file for a manufacturing line analysis is provided for use in building a manufacturing line to manufacture a motor vehicle. Another advantage of the present invention is that the method uses a neutral event file that enables integration of multiple and independently defined three dimensional CAD tooling, fixture, workcell, and product design models into a single and comprehensive total manufacturing line analysis model. Yet another advantage of the present invention is that the method enables analysis for entire manufacturing lines within one single modeling environment, prior to tooling fabrication and tryout of the actual manufacturing line. Still another advantage of the present invention is that the method brings together all the three dimensional product data, three dimensional tooling design data, tooling motions/behaviors, and interactions between tools and product data associated with an entire manufacturing line. A further advantage of the present invention is that the method provides for pre-build verification of workcell to workcell interactions and total manufacturing line operation, so that any necessary adjustments or changes in tool design can be made while the manufacturing line is still in "design state", rather than the current practice of not being able to test for workcell to workcell interaction issues until tool build and manufacturing line tryout.

Other features and advantages of the present invention will be readily appreciated, as the same becomes better understood, after reading the subsequent description taken in conjunction with the accompanying drawings.

DETAILED DESCRIPTION

Figure 1:
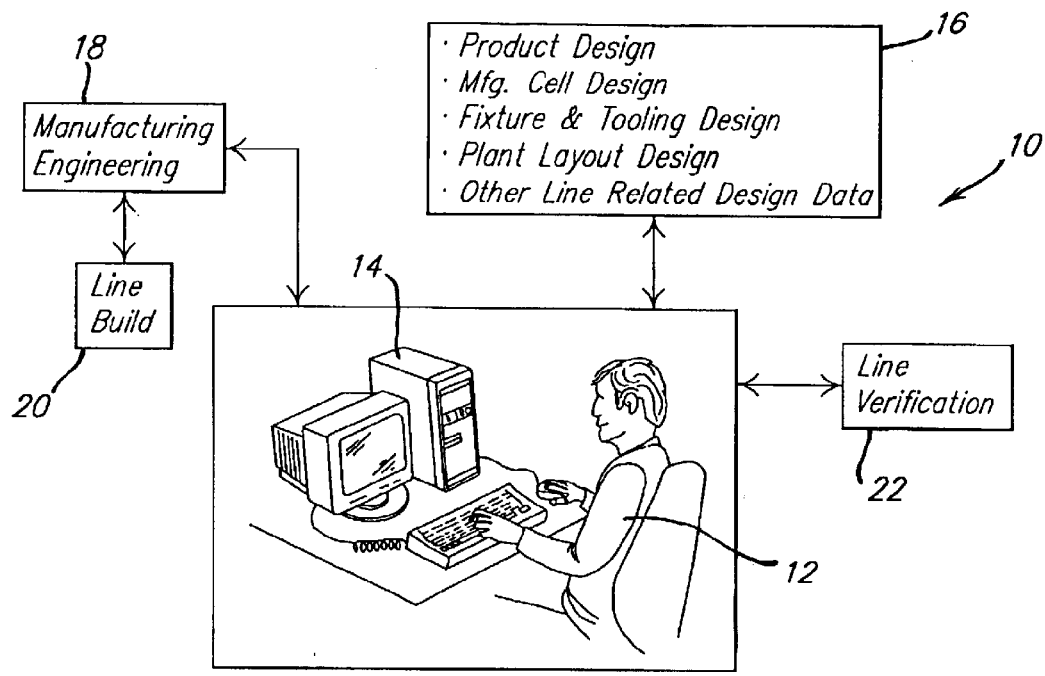
FIG. 1 is a diagrammatic view of a system, according to the present invention, for using a neutral event specification file for manufacturing line analysis illustrated in operational relationship with an operator.

Referring to the drawings and in particular FIG. 1, one embodiment of a system 10, according to the present invention, for using a neutral event specification file for manufacturing line analysis is illustrated. In the present invention, an operator 12 uses the system 10 to perform the manufacturing line analysis. The system 12 includes a computer 14 to send and receive information to and from a design engineering source 16 via an electronic link. The design engineering source 16 includes a product design system, manufacturing cell design system, fixture and tooling design system, plant layout design system, and other manufacturing line related design systems to provide engineering data for standard components, tools, fixture models, and robots to interact with the fixture models. These design systems have the ability to read and write in the neutral event file format, in this embodiment, named VisLine Event (VLE) format, which is used in a manufacturing line analyzing or modeling visualization environment. For example, the operator 12 may use the workcell design system to write to a neutral control model or event file for workcell models, incorporating information from the neutral event file from the fixture design system. Specifically, if a fixturing station has robots or flexible automation involved, the workcell design system will import the fixture and processing data defined in the neutral event file from the fixture design system, allowing the user to add robots to interact with the fixture and clamps. It should be appreciated that several neutral event files may be written by the systems of the design engineering source 16.

The computer 14 also sends and receives information to and from a manufacturing engineering source 18 via an electronic link. The manufacturing engineering source 18 includes data on manufacturing engineering such as a tooling line. The manufacturing engineering source 18 also sends and receives information to and from a manufacturing line build source 20 via an electronic link. The manufacturing line build source 20 includes data for building the manufacturing line (not shown) for the manufacture of parts (not shown) for a motor vehicle (not shown). The computer 14 also sends and receives information from a manufacturing line verification source 22 via an electronic link. The manufacturing line verification source 22 verifies the workcell to workcell interactions and total manufacturing line operation. It should be appreciated that the computer 12, electronic links, and sources are conventional and known in the art.

Figure 2:
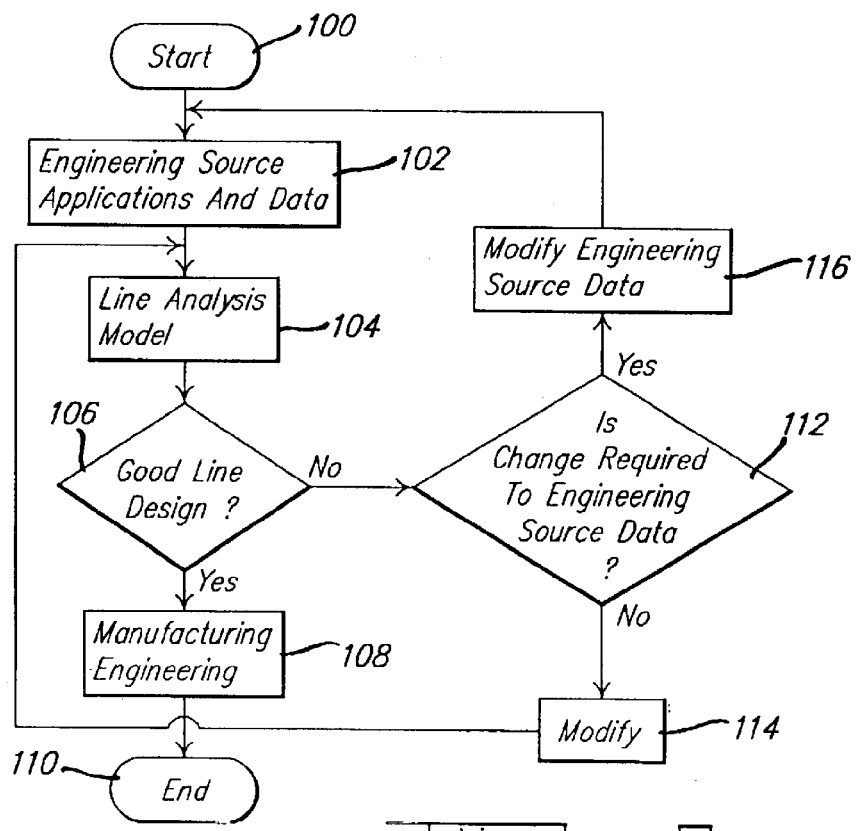
FIG. 2 is a flowchart of a method, according to the present invention, of using a neutral event specification file for manufacturing line analysis for the system of FIG. 1.

Referring to FIG. 2, a method, according to the present invention, of using a neutral event file for manufacturing line analysis with the system 10 is shown. The neutral event file is a neutral file that contains an event specification format to enable collecting, locating, and event integration of independently defined tooling and workcell models. In general, a model is typically some representation of critical elements of a real entity. As used herein, the neutral event file is a representation of the critical elements required to control manufacturing tooling. This term "neutral" is meaningful in that the event specification file used in this process is not specific to any one manufacturing tooling design or process planning system. The neutral event file contains a description of interlocked events (sometimes referred to as networked event), which define the required dependencies, actions, and signals that are associated with sequencing and cycling manufacturing tooling devices. For example, in constructing a vehicle body (not shown) of the motor vehicle, the event specification would have individual events that described when the conditions were correct for a clamp to open or close. It should be appreciated that event specification information from the neutral event file can be readily passed from one manufacturing design system to another as long as all the tool design systems can interpret the neutral event file format, in one embodiment, named VisLine Event (VLE) file. It should be appreciated that the method is carried out on the computer 14 of the system 10 by the operator 12.

The VLE file defines a series of events that can be played in a manufacturing line analysis model or visualization environment. The events define an action or actions that occur when it is activated and a structure of signals and dependencies to trigger the execution of events. The VLE file is a structured ASCII file that contains descriptions for one or more events. The order of events within the file is not relevant as one or more VLE files may be parsed and read into memory of the computer 14 at one time. It should be appreciated that only after all event descriptions are read are the events processed.

In the VLE file, events contain the following information:

Name=unique name for the event;

Description text description of what the event does;

Dependency=one or more dependencies that must be met before the event will be activated;

Signals=signals that can be set by the event that trigger dependencies in other events, wherein each event defines a STARTED and DONE signal and may set other custom signals;

Actions=one or more actions that may be performed by the event when it executes; and Child Events other events that are children of the current event and allows events to be organized in a hierarchical manner.

The syntax of the event block is shown below:

Event {

Name=<name>

[Description=<strings>]

[Dependency=<Dependency string>]

[Signals=<

<Signal name> <Boolean>

>]

[Action=<Action Block>]

[ChildEvent=<Event>]

}

Referring to FIG. 2, the method starts or begins in bubble 100 and advances to block 102. In block 102, the method receives information from engineering source applications and data such as the design engineering source 16. The engineering source applications and data may include product design, manufacturing cell design, fixture and tooling design, plant layout design, and other manufacturing line related design data. The product design information may be a single part or a plurality of parts to be assembled in a manufacturing line. The manufacturing cell design information typically includes flexible automation, for example robots, material handling, etc. The fixture and tooling design information typically includes hard tooling such as a clamp. The plant layout design information typically includes location of the manufacturing line, for example location of columns, aisles, etc. The other manufacturing line design information typically includes intersection points of other manufacturing lines (where two manufacturing lines merge), location of control panels, remote valving stations, energy cabinets, and other items that take up space that potentially could interfere with tool movements and operator interactions. The operator 12 uses the computer 14 to construct neutral event files for a single tool or cell sequence, geometry files, and tooling behavior motion files from the engineering source applications and data in block 102.

After block 102, the method advances to block 104 and executes a manufacturing line analysis model. The manufacturing line analysis model receives at least one neutral event file, geometry file, and tooling behavior or motion file. The neutral event file contains information in a neutral event specification file format to enable both integration and coordination of the independently defined tooling and workcell models. The neutral event file may be a single tool or workcell sequence for a standard component, tool and fixture. For example, the fixture design system has the ability to read and write in the VLE. Specifically, the fixture design system can create a neutral event specification file definition that describes how four clamps need to be sequenced along with a hard-tooled welder. The geometry file contains information of tessellated three-dimensional geometry to represent tooling space. Tessellation is the converting of very precise non-uniform relational boundary equations (partial and differential equations) into polygonal data (triangles, bricks, rectangles), which are less computationally intensive for a microprocessor of the computer 14 to generate and manipulate. The motion file contains information of transformational positional arrays to represent tooling motions and allowed tooling behavior. For example, a single pivot point clamp has only two allowed behaviors, when it rotates from an open position to a closed position when instructed, and then rotates from its closed position to its open position when instructed. In this example, there are two events, one for each allowed tooling motion or behavior. The motion files capture the allowed tooling behavior in transformational positional arrays and the use of a neutral event specification for integration of data and tooling behavior. The motion files use transformational positional arrays to capture in 4 by 4 arrays the position and orientation in three-dimensional space over given time intervals that the tessellated geometry of the tooling is being operated through in a form that is significantly less computationally intensive than the use of kinematic equations. It should be appreciated that the neutral event file information that describes events, dependencies, and logical conditions is to drive a manufacturing line analysis model to be described.

In block 104, the manufacturing line analysis model collects multiple independently defined manufacturing line data such as three dimensional digital data (geometry files), tooling behaviors (motion files), and tooling sequence (neutral event file). The manufacturing line analysis model organizes the manufacturing line and executes the manufacturing line such as location of fixtures, tooling, workcells, product transfer through manufacturing line, workcell to workcell integration, and total manufacturing line integration. The manufacturing line analysis model verifies the manufacturing line such as line capability to design criteria, product to manufacturing line compatibility, manufacturing line optimization relative to part flow, and manufacturing line fit to manufacturing plant layout. The method reads and manages the entire neutral event files required to model a manufacturing line by the manufacturing line verification source 22. The manufacturing line verification source 22 has the ability to read in the VLE files. The manufacturing line verification source 22 also has the ability to manage large amounts of computer aided drafting (CAD) data. The method writes a manufacturing line analysis model file by the manufacturing line verification source 22 to "logically link" the workcells into a manufacturing line. The manufacturing line verification source 22 has the ability to write in VLE that enables logical linking the neutral event files, geometry files, and motion files. The method plays a manufacturing line analysis model by the manufacturing line verification source 22, which is driven by the control model described within the manufacturing line analysis model file. It should be appreciated that the manufacturing line verification source 22 is predominately a collector of data and a viewing tool, not a creator of data.

From block 104, the method advances to diamond 106 and determines whether a good manufacturing line analysis model exists by the operator 12. For example, the operator 12 determines whether there is interference between a clamp moving and the location of a column of the manufacturing plant. If a good manufacturing line analysis model exists, the method advances to block 108 and the manufacturing line analysis model is verified and manufacturing engineering proceeds with the build of the manufacturing line.

In diamond 106, if the manufacturing line analysis model is not good or correct, the method advances to diamond 112 and determines whether a change is required to the engineering source data from the design engineering source 16 such as the fixture design system and/or workcell design system to adjust the fixture/workcell description by the fixture design system and workcell design system. If no change is required, the method advances to block 114 and modifies the manufacturing line analysis model previously described. In block 114, the method modifies the geometry locations and sequence data from the neutral event file. The method then advances to block 104 previously described.

In diamond 112, if a change is required, the method advances to block 116 and modifies the engineering source data. In block 116, the method modifies the geometry and tool behavior or motion from the geometry files and motion files, respectively. The method then advances to block 102 previously described.

Accordingly, the present invention uses a neutral event specification to create flexibility in that it does not require the manufacturing tool design technologies to all be using the same CAD engine, as now the event information is transported and described independent of the actual geometric description of the tooling models and does not require the use of intelligent tooling object models. The present invention allows for unlimited scope that manufacturing line models can be defined because of being independent of a specific CAD system. This enables building up of scaleable manufacturing modeling solutions, since the event specification file is a set of interlocked events and multiple event specification files can be brought together, independent of the manufacturing tool design system that created them. This neutral event specification can then be delivered to a workcell modeling system, where robots are then added around the fixture, and the event specification file initially defined by the fixture modeling system is now augmented by the workcell modeling system to account for the robots now having to interact with the fixture and clamps. The scale continues to grow as now several workcell level neutral control models are brought together in manufacturing line modeling technology, and once again the event specification files are augmented to reflect manufacturing line level integration and interaction requirements.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of using a neutral event file for manufacturing line analysis, said method comprising the steps of:

constructing at least one neutral event file containing a description of interlocked events for a manufacturing line;

constructing a manufacturing line analysis model using the at least one neutral event specification file, at least one geometry file, and at least one motion file;

executing the manufacturing line analysis model using a manufacturing line verification system to verify the manufacturing line;

determining by an operator whether an acceptable manufacturing line exists based on the manufacturing line analysis model; and using the manufacturing line analysis model to build the manufacturing line if determined that an acceptable manufacturing line exists.

2. A method as set forth in claim 1 including the step of determining whether a change is required to the manufacturing line if determined that an acceptable manufacturing line does not exist.

3. A method as set forth in claim 2 including the step of modifying the manufacturing line analysis model if a change is not required to the manufacturing line.

4. A method as set forth in claim 2 including the step of modifying the at least one neutral event file if a change is required to the manufacturing line.

5. A method as set forth in claim 1 wherein said step of constructing the at least one neutral event file is based on engineering source applications and data.

6. A method as set forth in claim 1 wherein said step of executing the manufacturing line analysis model includes receiving the at least one neutral event file, the at least one geometry file, and the at least one motion file.

7. A method as set forth in claim 6 wherein said step of executing includes linking the at least one neutral specification file, the at least one geometry file, and the at least one motion file together to form the manufacturing line analysis model.

8. A method as set forth in claim 6 wherein said step of executing further comprises playing the manufacturing line analysis model by the manufacturing line verification system.

9. A method as set forth in claim 4 wherein said step of modifying the at least one neutral event file includes modifying engineering source applications and data.

10. A method as set forth in claim 3 wherein said step of modifying the manufacturing line analysis model includes modifying the at least one geometry file and the at least one motion file.

11. A method as set forth in claim 1 wherein said step of constructing the at least one neutral event file comprises generating a specification format having a name, description, at least one dependency, at least one signal, and at least one action.

12. A method as set forth in claim 1 including the step of verifying the manufacturing line model if determined that an acceptable manufacturing line model exists.

13. A method as set forth in claim 12 wherein said step of verifying comprises playing the manufacturing line analysis model by the manufacturing line verification system.

14. A method of using a neutral event file for manufacturing line analysis, said method comprising the steps of:
constructing at least one neutral event file containing a description of interlocked events for a manufacturing line based on engineering source applications and data;
receiving the at least one neutral event file, at least one geometry file, and at least one motion file;
constructing a manufacturing line analysis model using the at least one neutral event specification file, the at least one geometry file, and the at least one motion file;
executing a manufacturing line analysis model using a manufacturing line verification system to verify the manufacturing line;
determining by an operator whether an acceptable manufacturing line exists based on the manufacturing line analysis model; and
using the manufacturing line analysis model to build the manufacturing line if determined that an acceptable manufacturing line exists.

15. A method as set forth in claim 14 including the step of determining whether a change is required to the manufacturing line if determined that an acceptable manufacturing line does not exist.

16. A method as set forth in claim 15 including the step of modifying the manufacturing line analysis model if a change is not required to the manufacturing line.

17. A method as set forth in claim 15 including the step of modifying the at least one neutral event file if a change is required to the manufacturing line.

18. A method as set forth in claim 14 wherein said step of executing further comprises playing the manufacturing line analysis model by the manufacturing line verification system.

19. A method as set forth in claim 14 wherein said step of constructing the at least one neutral event file comprises generating a specification format having a name, description, at least one dependency, at least one signal, and at least one action.

20. A method of using a neutral event file for manufacturing line analysis, said method comprising the steps of:
constructing a neutral event file containing a description of interlocked events for a manufacturing line based on engineering source applications and data;
receiving the at least one neutral event file, at least one geometry file, and at least one motion file;
constructing a manufacturing line analysis model using the at least one neutral event specification file, the at least one geometry file, and the at least one motion file;
executing a manufacturing line analysis model using a manufacturing line verification system to verify the manufacturing line;
determining by an operator whether an acceptable manufacturing line exists based on the manufacturing line analysis model;
using the manufacturing line analysis model to build the manufacturing line if determined that an acceptable manufacturing line exists;
determining whether a change is required to the manufacturing line if determined that an acceptable manufacturing line does not exist;
modifying the manufacturing line analysis model if a change is not required to the manufacturing line; and
modifying the at least one neutral event file if a change is required to the manufacturing line.

* * * * *